United States Patent
Gardes et al.

(10) Patent No.: US 9,747,723 B2
(45) Date of Patent: Aug. 29, 2017

(54) AUGMENTED REALITY FOR VIDEO SYSTEM

(71) Applicants: Laurent Gardes, Meudon (FR); Yann Prat, Elancourt (FR); Olivier Lacour, Paris (FR); Didier De Marrez, Charenton-le-Pont (FR); Laurent Chauvier, Villevallier (FR)

(72) Inventors: Laurent Gardes, Meudon (FR); Yann Prat, Elancourt (FR); Olivier Lacour, Paris (FR); Didier De Marrez, Charenton-le-Pont (FR); Laurent Chauvier, Villevallier (FR)

(73) Assignee: Cisco Technology, Inc., San Jose, CA (US)

( * ) Notice: Subject to any disclaimer, the term of this patent is extended or adjusted under 35 U.S.C. 154(b) by 72 days.

(21) Appl. No.: 14/425,327

(22) PCT Filed: Sep. 3, 2013

(86) PCT No.: PCT/IB2013/058254
§ 371 (c)(1),
(2) Date: Mar. 3, 2015

(87) PCT Pub. No.: WO2014/037876
PCT Pub. Date: Mar. 13, 2014

(65) Prior Publication Data
US 2015/0206350 A1  Jul. 23, 2015

Related U.S. Application Data

(60) Provisional application No. 61/743,431, filed on Sep. 4, 2012.

(51) Int. Cl.
*G06T 19/00* (2011.01)
*G06T 7/00* (2017.01)
(Continued)

(52) U.S. Cl.
CPC .......... *G06T 19/006* (2013.01); *G06F 3/0346* (2013.01); *G06F 3/1423* (2013.01);
(Continued)

(58) Field of Classification Search
CPC ....... G06T 19/006; G06T 15/20; G06T 7/004; G06T 11/00; H04N 5/265; H04N 21/8146;
(Continued)

(56) References Cited

U.S. PATENT DOCUMENTS

| | | | |
|---|---|---|---|
| 2006/0038833 A1 | 2/2006 | Mallinson et al. | |
| 2012/0120296 A1* | 5/2012 | Roberts | H04N 21/4126 348/333.12 |
| 2012/0309523 A1* | 12/2012 | Yamashita | A63F 13/655 463/31 |

FOREIGN PATENT DOCUMENTS

| | | |
|---|---|---|
| EP | 02485119 | 8/2012 |
| WO | 2007/128949 | 11/2007 |

OTHER PUBLICATIONS

International Search Report dated May 9, 2014.

* cited by examiner

*Primary Examiner* — Kee M Tung
*Assistant Examiner* — Yi Wang
(74) *Attorney, Agent, or Firm* — Samuel M. Katz

(57) ABSTRACT

In one embodiment, a method includes: displaying an event on a first display device associated with a client device, the event comprising at least one video scene; enabling an electronic device to communicate with the client device; receiving a user input requesting augmented reality content associated with the at least one video scene; identifying a relevant portion of the augmented reality content to render on a second display associated with the electronic device, wherein the relevant portion comprises video frames corre- (Continued)

sponding to the at least one video scene and additional content surrounding the video frames; and rendering the relevant portion on the second display device.

12 Claims, 8 Drawing Sheets

(51) Int. Cl.
| | | |
|---|---|---|
| *G06F 3/14* | (2006.01) | |
| *H04N 5/265* | (2006.01) | |
| *G06T 15/20* | (2011.01) | |
| *G06F 3/0346* | (2013.01) | |
| *H04N 21/41* | (2011.01) | |
| *H04N 21/431* | (2011.01) | |
| *H04N 21/439* | (2011.01) | |
| *H04N 21/44* | (2011.01) | |
| *H04N 21/4722* | (2011.01) | |
| *H04N 21/488* | (2011.01) | |
| *H04N 21/81* | (2011.01) | |
| *G06T 11/00* | (2006.01) | |
| *G06T 7/70* | (2017.01) | |

(52) U.S. Cl.
CPC ............... *G06T 7/70* (2017.01); *G06T 11/00* (2013.01); *G06T 15/20* (2013.01); *H04N 5/265* (2013.01); *H04N 21/4126* (2013.01); *H04N 21/4316* (2013.01); *H04N 21/4394* (2013.01); *H04N 21/44008* (2013.01); *H04N 21/4722* (2013.01); *H04N 21/488* (2013.01); *H04N 21/816* (2013.01); *H04N 21/8126* (2013.01); *H04N 21/8146* (2013.01); *G06F 2200/1637* (2013.01)

(58) Field of Classification Search
CPC ............... H04N 21/488; H04N 21/816; H04N 21/4722; H04N 21/8126; H04N 21/4394; H04N 21/4316; H04N 21/44008; H04N 21/4126; G06F 3/1423; G06F 3/0346; G06F 2200/1637
See application file for complete search history.

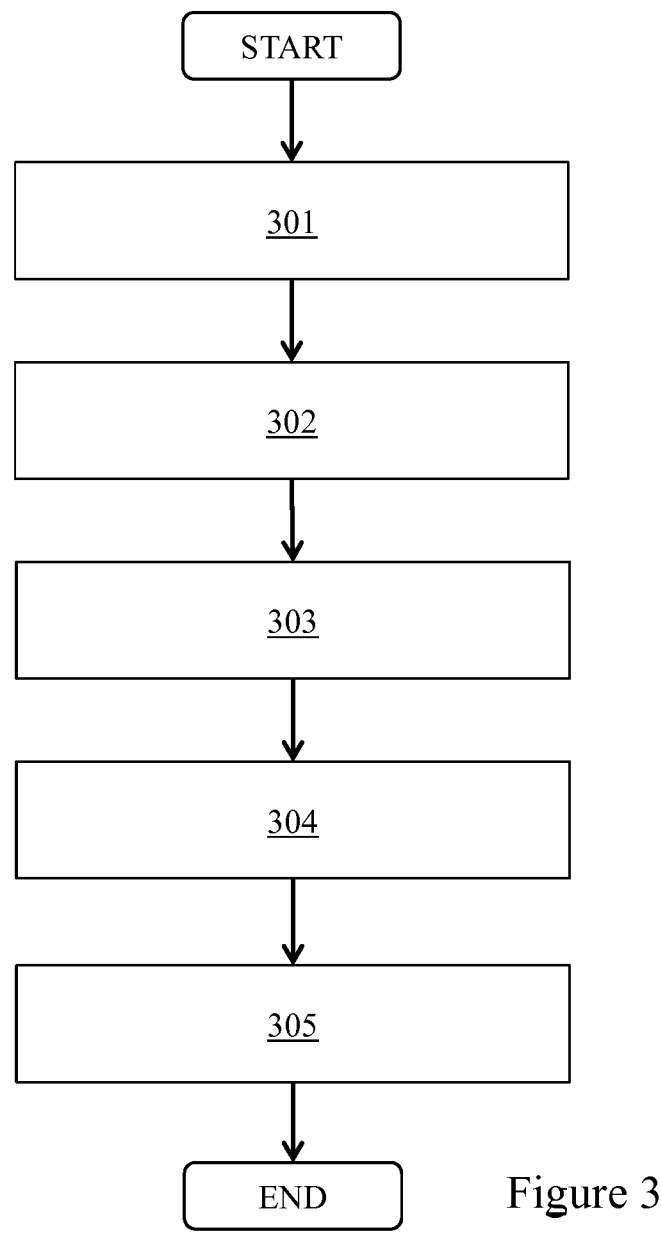

AUGMENTED REALITY FOR VIDEO SYSTEM

The present application is a §371 submission of International Application No. PCT/IB2013/058254, which was filed on 3 Sep. 2013, which was published in the English language on 13 Mar. 2014 with publication number WO 2014/037876, and which claims the benefit of the filing date of U.S. Provisional Patent Application 61/743,431, filed 4 Sep. 2012.

TECHNICAL FIELD

The present invention relates to methods and apparatus for providing augmented reality content to a video content item.

BACKGROUND

Augmented reality (AR) is a live, direct or indirect, view of a physical, real-world environment whose elements are augmented (or supplemented) by computer-generated sensory input such as sound, video, graphics or GPS data. Augmentation is typically in real-time and in semantic context with environmental elements.

An increased number of different Augmented Reality applications are now available to users via smartphones, tablet computers, or other handheld devices. Typically, these applications use cameras embedded in the handheld device and display contextual information overlaid onto real images captured by the camera.

BRIEF DESCRIPTION OF THE DRAWINGS

The present invention will be understood and appreciated more fully from the detailed description, taken in conjunction with the drawings in which:

FIG. 3 is a flow chart diagram of a method to view augmented reality content according to an embodiment of the present invention;

DESCRIPTION OF EXAMPLE EMBODIMENTS

Overview

In one embodiment, a method includes: displaying an event on a first display device associated with a client device, the event comprising at least one video scene; enabling an electronic device to communicate with the client device; receiving a user input requesting augmented reality content associated with the at least one video scene; identifying a relevant portion of the augmented reality content to render on a second display associated with the electronic device, wherein the relevant portion comprises video frames corresponding to the at least one video scene and additional content surrounding the video frames; and rendering the relevant portion on the second display device.

Example Embodiments

In the following description, numerous specific details are set forth in order to provide a thorough understanding of the various principles of the present invention. However, those skilled in the art will appreciate that not all these details are necessarily always required for practicing the present invention. In this instance, well-known circuits, control logic, and the details of computer program instructions for conventional algorithms and processes have not been shown in detail in order not to obscure the general concepts unnecessarily.

Although the principles of the present invention are largely described herein in relation to a television broadcast environment and related television applications, this is an example selected for convenience of presentation, and is not limiting.

Figure 1:
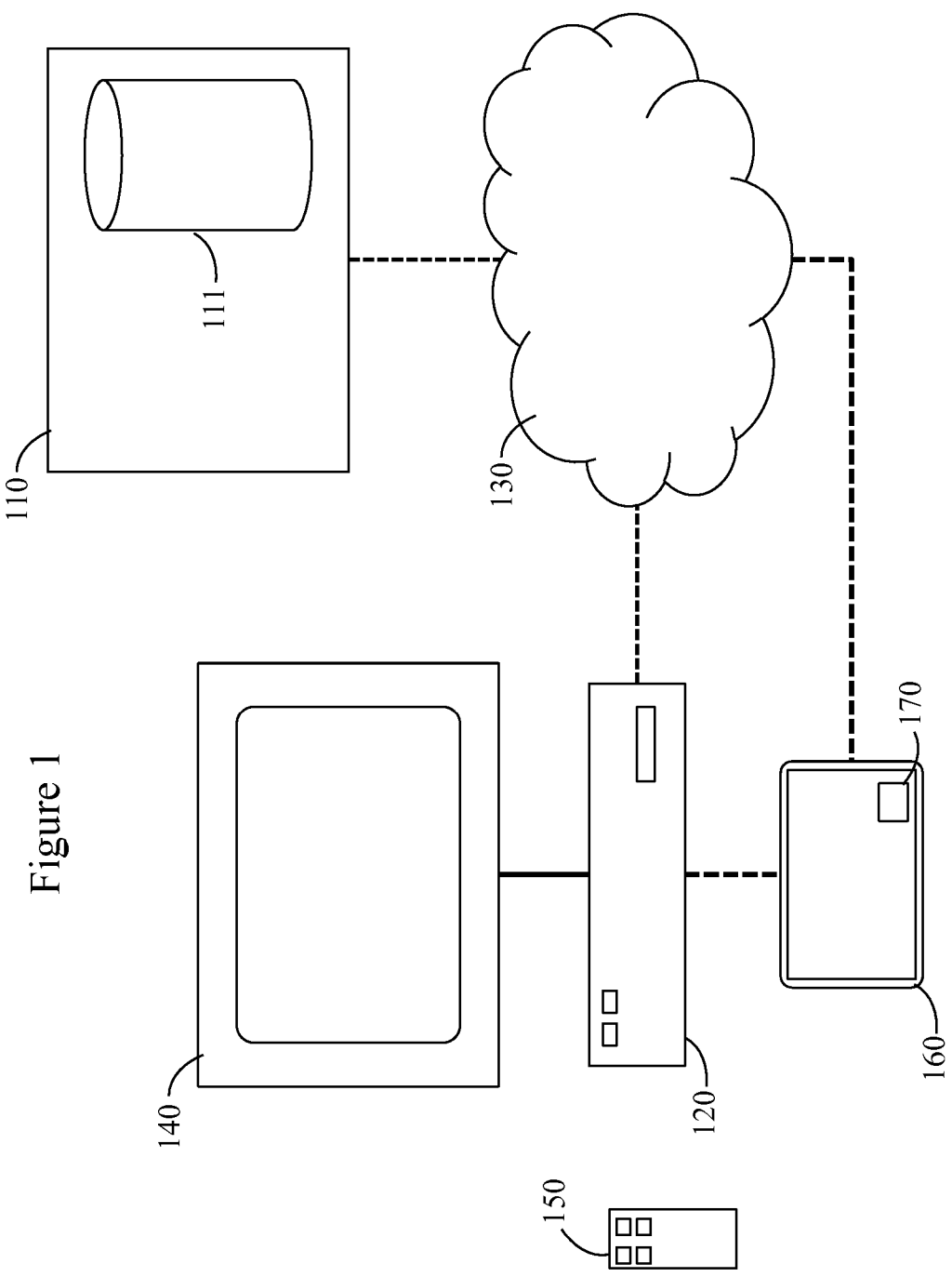
FIG. 1 is a simplified block diagram illustration of a system constructed and operative in accordance with an embodiment of the present invention.

Reference is now made to FIG. 1, which is a simplified block diagram illustration of a system constructed and operative in accordance with an embodiment of the present invention.

A headend 110 typically communicates with a plurality of client devices via a communication network 130. Additionally or alternatively, a plurality of headends communicate with a single client device or with a plurality of client devices via the communication network 130. For simplicity of depiction and description, and without limiting the generality of the present invention, one client device 120 is depicted in FIG. 1 as being in operative communication (via communication network 130) with one headend 110. Headend 110 also comprises a video database 111 that will be described in greater details hereinafter in relation to FIG. 2.

The communication network 130 is a one-way or two-way communication network that includes at least one of the following: a satellite based communication network; a cable based communication network; a conventional terrestrial broadcast television network; a telephony based communication network; a telephony based television broadcast network; a mobile-telephony based television broadcast network; an Internet Protocol (IP) television broadcast network; and a computer based communication network. It is appreciated that in other embodiments of the present invention, the communication network 130 may, for example, be implemented by a one-way or two-way hybrid communication network, such as a combination cable-telephone network, a combination satellite-telephone network, a combination satellite-computer based communication network, or by any other appropriate network. Other ways of implementing the communication network 130 will be apparent to someone skilled in the art.

The system of FIG. 1 comprises a client device 120 disposed between a headend 110 and a display device 140. Client device 120 is coupled to a display device 140. Client device 120 typically comprises a tuner, a decoder, a receiver and a descrambler. It is appreciated that the client device 120 comprises standard hardware components and software components, as is well known in the art.

Client device 120 is typically connected in operation to display device 140 via a digital AV interface (e.g. HDMI, DVI, etc.) or via an analogue AV interface (e.g. component (RGB, YPbPr), composite (NTSC, PAL, SECAM), S-video, SCART, RF coaxial, D-Terminal (D-tanshi) etc.). While shown as separate entities in FIG. 1, the client device 120 may be integral with the display device 140 in other embodiments of the present invention.

Client device 120 typically receives audio visual (AV) signals from e.g. a broadcast stream, a VOD library, etc., as well as related digital data. The client device typically decodes and decrypts/descrambles as necessary the AV signals received from a headend 110 optionally under control of a conditional access device such as removable security element as is well known in the art. The removable security element typically includes a smart card as is well known in the art. The output from client device 120 comprises a decoded and decrypted/descrambled as necessary audio video (AV) signals ready to be displayed on the display device 140. Furthermore, the client device 120 typically runs onboard software stored within a memory of the client device 120, the onboard software comprising applications (e.g. electronic program guide (EPG), pay-per-view (PPV) resident application, video-on-demand (VOD) resident application, etc.), an intermediate software layer (middleware), software layers for controlling the device layer interface that provides an interface between the middleware and the decoder hardware controllers, and all other layers used to operate the client device 120.

Client device 120 is typically controlled by a user, for example via a remote control unit (RCU) 150. Client device 120 can receive control commands from the RCU 150 (e.g. via infra-red communication). RCU 150 is used by a user to select AV content to view, such as a live event broadcast, a Video-On-Demand (VOD) asset, a recorded event, etc., or to select a particular application to run, such as an EPG, a PPV application, a VOD application, etc., which is then displayed on the display device 140. The onboard software within client device 120 monitors user interaction with the client device 120 so that the relevant information is displayed on the display device 140 in response to a user command entered using the RCU 150.

Furthermore, an electronic device 160 is provided that is operable to communicate with the client device 120 using any suitable connectivity link (e.g. wired, WiFi, Bluetooth, RF, etc.). The electronic device 160 is further operable to communicate with the headend 110 through the communication network 130. FIG. 1 shows only one communication network 130. However, those skilled in the art will appreciate that the electronic device 160 may communicate directly with the headend 110 using the same communication network 130 or a different communication network. The electronic device 160 may be for example, but without limiting the generality of the invention, a companion device such as a tablet computer, an iPad™, or a mobile computing device, such as a Personal Digital Assistant (PDA), mobile phone, or any handheld device. The electronic device 160 typically comprises a processor, a video player, a rendering screen for displaying content and data information to a user, a camera operative to take pictures and/or videos and an orientation module 170 comprising a plurality of sensors such as, for example, but without limiting the generality of the present invention, an accelerometer sensor, a gyroscope, a manual switch, etc. operative to detect the orientation of the electronic device 160.

A user is typically able to select an event or a service to be displayed on the display device 140. Further, the user is typically able to select an application to be run on the electronic device 160 in order to get augmented reality content related to the event currently being displayed on the display device 140. The application may be locally executed on the electronic device 160 and launched as soon as an event is selected for display by the user, or upon reception of a notification transmitted by a video database 111 notifying the user that augmented reality content is available for the event. In the latter case, the notification indicating that augmented reality content is available may be, for example, but without limiting the generality of the present invention, in a form of a visual indication such as an On-Screen Display (OSD) or pop-up message appearing on the display device 140. It will be apparent to someone skilled in the art that any suitable form of visual and/or sound indication may be used to notify the user that augmented reality content is available. Once the application is launched, communication between the electronic device 160 and client device 120 and/or headend 110 is established. The user may decide to view this augmented reality content and to do so is requested to hold the electronic device 160 in front of the display device 140 for a calibration procedure, which is typically automatic. Once the calibration procedure is successfully achieved, the current video scene of the event or service currently being displayed on the display device 140 is also displayed on the rendering screen of the electronic device 160 and the user is further able to view augmented reality content (i.e. surrounding content received from the video database 111) related to the video scene currently being displayed on the display device 140.

Figure 2:
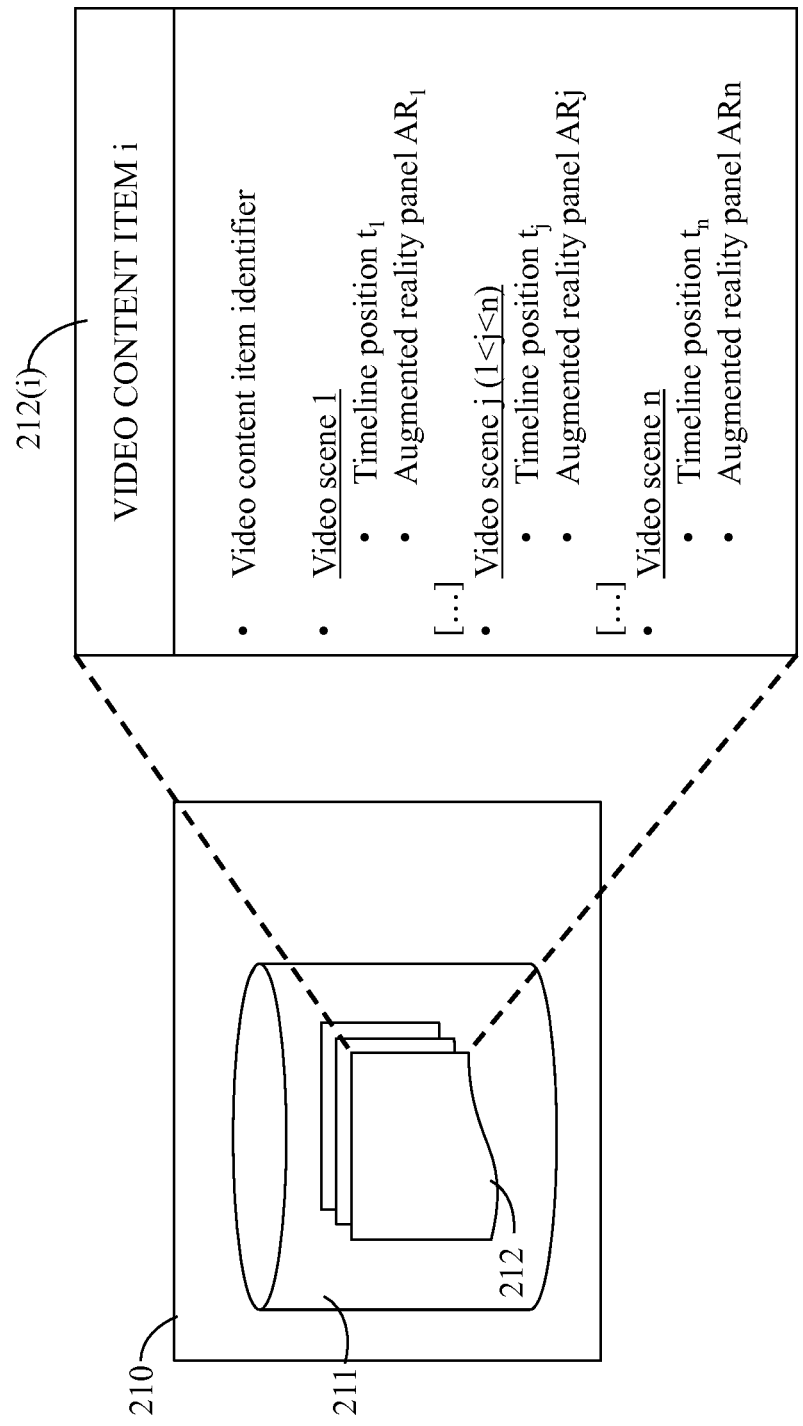
FIG. 2 is a simplified block diagram illustration of a video database constructed and operative in accordance with an embodiment of the present invention.

Reference is now made to FIG. 2, which is a simplified block diagram illustration of a video database 211 constructed and operative in accordance with an embodiment of the present invention.

The video database 211 is typically located at the headend 210 and comprises metadata related to a plurality of video content items 212. Those skilled in the art will appreciate that this video database 211 may be in any suitable form and located in any suitable part of the system of the present invention. Other ways of implementing the database 211, such as using a plurality of databases, will be apparent to someone skilled in the art.

A video content item 212(i) typically comprises a sequence of video frames representing one or more video scenes. In an embodiment of the present invention, a video content item 212(i) is identified by a video content identifier and metadata is provided for each video scene of the video content item 212(i). Metadata provided for each video scene typically comprise at least:

a timeline position identifying when the video scene occurs in the video content item. This timeline position may be for example, but without limiting the generality of the invention, a time elapsed since the beginning of the video content item 212(i), start and end times of the video scene, or a duration of the video scene, etc.; and
augmented reality content that may be accessed and viewed by a user while the video scene of the video content item 212(i) is being played on the display device 140. This augmented reality content is typically in a form of an augmented reality panel comprising the video frames of the relevant video scene of the video content item 212(*i*) and additional content surrounding the video frames. The additional content may be for example, but without limiting the generality of the present invention, pictures, videos, etc. retrieved from any suitable source (e.g. web sources, local contents, etc.). Once retrieved, the additional content is aggregated and arranged around the video frames to form the augmented reality panel relevant to the video scene of the video content item 212(*i*). In another embodiment of the present invention, the surrounding content may already be available in situations where the video scene currently being displayed is a subset of the original filmed image. Also, the dimensions of the augmented reality panel as well as the position of the video frames corresponding to the video scene currently being displayed in the augmented reality panel are defined in advance.

Those skilled in the art will appreciate that the video content items 212 which populate the video database 211 may be selected and provided by a TV broadcaster, a platform operator, a content provider or any third party entity. Hence, a wide selection of regular TV broadcast events, VOD assets, and other video content items may be available to be used by the application and/or the end user. Furthermore, the video database 211 may also be updated regularly by a TV broadcaster, a platform operator, a content provider or any third party entity in order to make available new video content items 212 and their associated metadata to users of the application.

Similarly, the video scenes of each video content item 212 supporting this augmented reality content system may be defined in advance by the TV broadcaster, platform operator, content provider or any third party entity providing this service. Indeed, it will be apparent to someone skilled in the art that displaying meaningful augmented reality contents to users depends on the type of event and video scene. An event may have several different video scenes, real or imaginary, taking place in many different places. Therefore, it may be complicated or even sometimes impossible to provide such augmented reality content for some video scenes of the event. The present invention is well-suited for situations in which, for example, but without limiting the generality of the present invention, the action takes place in a same room or when the video scene is filmed with a same fixed camera angle.

Figure 4A:
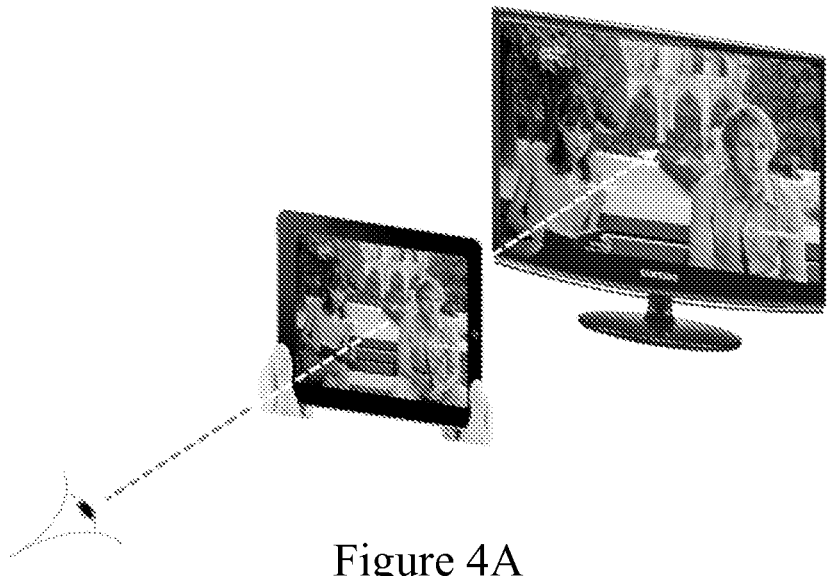
FIG. 4A is a simplified pictorial illustration of a calibration procedure in accordance with an embodiment of the present invention.
Figure 4B:
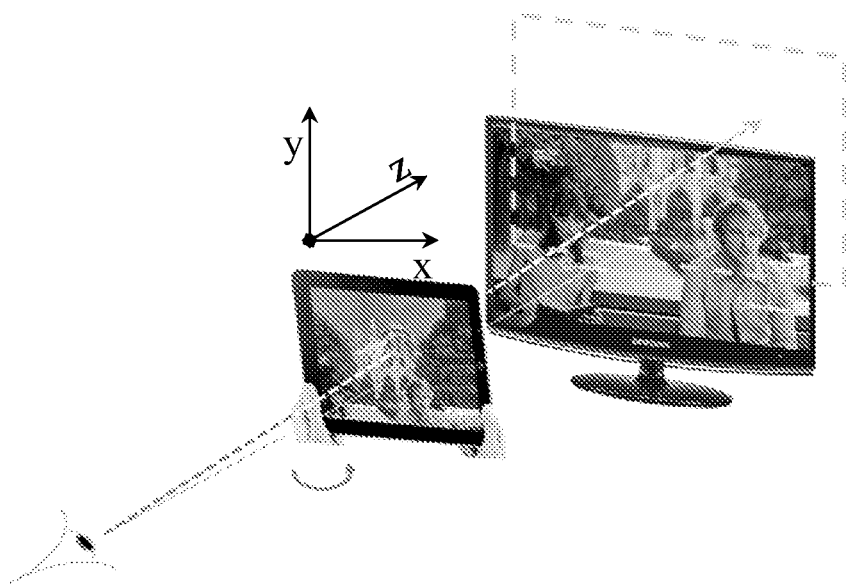
FIG. 4B is a simplified pictorial illustration showing augmented reality content obtained after rotating an electronic device around an axis parallel to a plane of its rendering screen in accordance with an embodiment of the present invention.

Finally, the position of the video frames in the augmented reality panel may vary from one video scene to another. Depending on the video scene, the video frames may be located in any suitable position so that relevant surrounding content is available to the user. The video frames shown in FIGS. 4A and 4B show two actors sitting on a bench with a garden and Notre-Dame Cathedral in the background. Therefore, the video frames showing the actors may be located at the bottom center of the augmented reality panel so that surrounding content relevant to the garden and Notre-Dame Cathedral is available on the left, right and top of the video frames. Those skilled in the art will appreciate that the position depends on many factors such as the TV broadcaster, platform operator, content provider or any third party entity providing this service, the relevant video scene, the available surrounding content, etc.

Reference is now made to FIG. 3, which is a flow chart diagram of a method to view augmented reality content according to an embodiment of the present invention.

At step 301, the user may select an event or a service to be displayed on the display device 140 by operating a RCU 150 e.g. a remote control. Upon reception of the user's choice, the client device 120 tunes to the selected event or service and demultiplexes, decodes and decrypts/descrambles as necessary the broadcast television stream received from the headend 110 in order to display the selected event or service on the display device 140. Although described in relation to a live TV event broadcast, those skilled in the art will appreciate that the event may be any suitable type of event such as a recorded event, a VOD asset, etc.

At step 302, the event currently being displayed on the display device is identified and it is determined if that event supports augmented reality video content. To do so, an event identifier is compared to the video content item identifiers present in the video database 111. If there is no match, no augmented reality content is available for the event currently being displayed. On the contrary, if there is a match, then augmented reality content may be available for the event currently being displayed on the display device 140. In the latter case, the client device 120 continuously monitors the time elapsed since the beginning of the event and compares it to the timeline position of the different video scenes of the identified video content item 212(*i*). When it is determined that the video scene of event currently being displayed on the display device 140 corresponds to a video scene of the video content item 212(*i*), the user is notified—via a sound or visual indication as explained hereinabove—that augmented reality content may be available for the video scene of the event currently being displayed.

In an embodiment of the present invention, the user may decide at step 303 to run an application on his electronic device 160 to obtain and view augmented reality content relevant to the event or service currently being displayed on the display device 140. As explained hereinabove, the user may run the application as soon as the event selected is displayed on the display device 140 or upon reception of a notification from a video database 111 that augmented reality content is available for the video scene currently being displayed. Those skilled in the art will appreciate that the application may be a distributed computing application and therefore, that the application may be executed in any or in a plurality of suitable computing devices of a distributed computing system. Once launched, the electronic device 160 is operable to communicate with the video database 111 of the headend 110. Additionally and/or alternatively, the communication between the electronic device 160 and the video database 111 is established via the client device 120. The augmented reality panel related to the video scene currently being displayed is retrieved from the video database 111 and stored on the client device 120 therefore becoming accessible and/or available to be used by the electronic device 160. It will be apparent to someone skilled in the art that the augmented reality panel related to the video scene currently being displayed may also be streamed in real time by the electronic device 160 from the video database 111.

Prior to viewing the augmented reality content relevant to the video scene currently being displayed, the user is requested to hold his electronic device 160 in front of the display device 140 (as illustrated in FIG. 4A) for an automatic calibration procedure (step 304). The purpose of this calibration procedure is to determine how and which portion of the augmented reality panel (which depends on the distance and direction between the display device 140 and the electronic device 160) is to be displayed on the rendering screen of the electronic device 160. To do so, the position where the video frames of the augmented reality panel are to be displayed on the rendering screen of the electronic device 160, and the dimensions of the video frames, are automatically computed using the camera of the electronic device 160. The computed dimensions typically corresponds to a homothetic transformation of the dimensions and position of the video displayed on the display device 140 as viewed by the user in the plane of the rendering screen of the electronic device 160. In other words, the position and the dimensions of the video frames are calculated to correspond to the dimensions of the video displayed on the display device 140 as they would be seen by the user in the plane of the rendering screen of the electronic device 160 and not as they are rendered on the rendering screen by the camera of the electronic device 160. Also, the absolute direction of the display device 140 is determined using the orientation module 170 e.g. the gyroscope sensor of the electronic device 160. This absolute direction may be corrected as the camera is usually not centered on the middle of the electronic device 160 to give the initial direction. This initial direction obtained during the calibration procedure is stored for later use. At the end of the automatic calibration procedure, the relevant portion of the augmented reality panel related to the video scene of the event currently being displayed on the display device 140 is identified and rendered on the rendering screen of the electronic device 160 with:
 the video frames (and in turn, the augmented reality panel) located and resized according to the computed dimensions; and
 the initial direction.

Therefore, as sizes of display device 140 and electronic device 160 as they are seen by the user do not necessarily correspond, the first portion of the augmented reality panel relevant to the current video scene is rendered on the rendering screen of the electronic device 160 already with surrounding additional content. For avoiding any parallax issues, the rendering on the electronic device 160 is done as if the user is standing right in front of the display device 140 regardless of his actual position (or position at the time when the calibration procedure was performed) with respect to the display device 140. The calibration procedure and related calculations will be described in greater details hereinafter in relation to the description of FIGS. 5, 6 and 7.

Figure 4C:
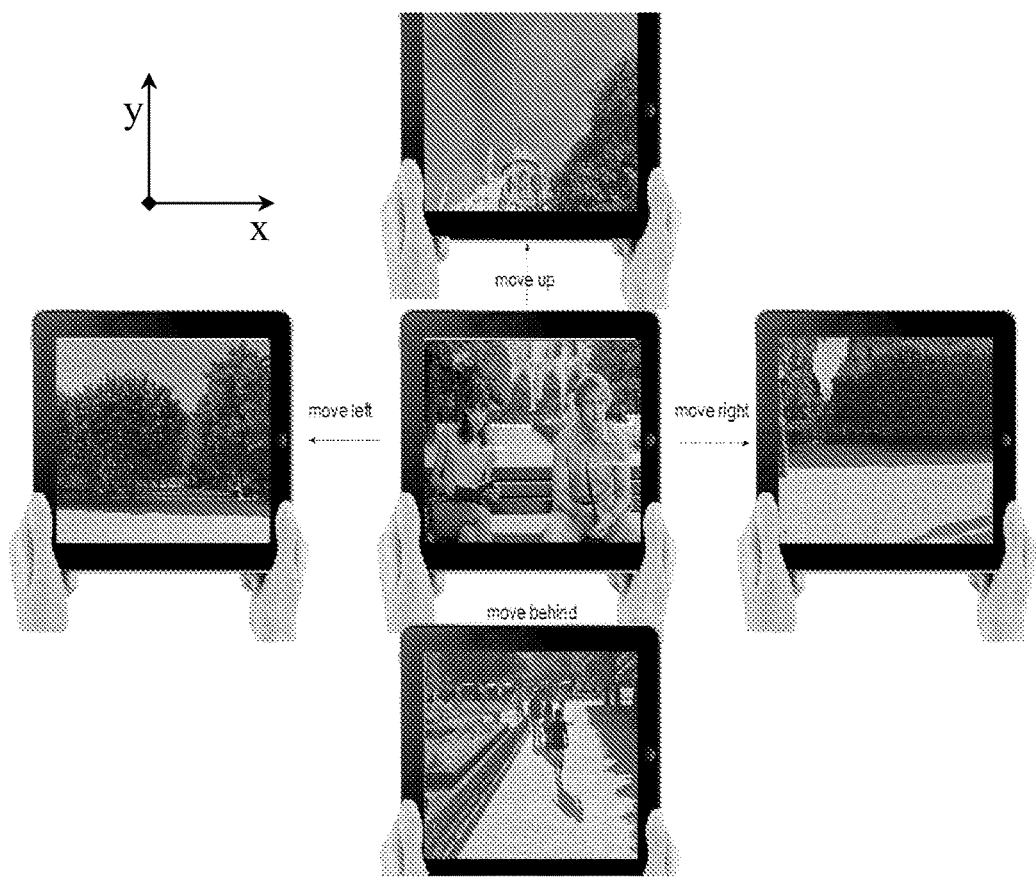
FIG. 4C are simplified pictorial illustrations showing augmented reality content obtained by translating an electronic device along an axis perpendicular to a plane of its rendering screen in accordance with an embodiment of the present invention.

At step 305, the user is able to move the electronic device 160 and see augmented reality content surrounding the video frames of the video scene currently being displayed. The orientation module 170 (e.g. gyroscope and accelerometer sensors) as well as the camera of the electronic device 160 are used to continuously communicate the current position and orientation of the electronic device 160 to the client device 120. When the user rotates the electronic device 160 around an axis parallel to a plane of the rendering screen, the new position and orientation of the electronic device 160 are determined and the new relevant portion of augmented reality panel (comprising the video frames of the video scene and surrounding additional content) is displayed on the rendering screen of the electronic device 160. FIG. 4B shows the user rotating the electronic device 160 around the X-axis parallel to a plane of the rendering screen in order to see augmented reality content located above the video frame of the video scene currently being displayed. Similarly, FIG. 4C shows different portions of the augmented reality panel displayed on the rendering screen of the electronic device 160 when the user rotates the electronic device 160 around an axis parallel to the plane of the rendering screen:
 rotation around the Y-axis for left (view 1) and right (view 2) views; and
 rotation around the X-axis for top (view 3) and bottom (view 4) views.

Also, when the user is moving along the Z-axis perpendicular to the plane of the rendering screen of the electronic device 160 to get closer (or farther) to (from) the display device 140, a zoom-in (or zoom-out) effect may be achieved. This type of user's motion involves real time calculations in order to determine and update the position where the video frames of the video scene currently being displayed are to be displayed on the rendering screen of the electronic device 160, and the dimensions of the video frames (and in turn, the dimensions of the augmented reality panel). Those skilled in the art will appreciate that these calculations are similar to the ones made during the calibration procedure. Further details regarding the motion detection and related effects rendered on the rendering screen of the electronic device 160 will be given hereinafter in relation to the description of FIG. 7.

As explained hereinabove in relation to step 304 of FIG. 3, the purpose of the calibration procedure is to determine how and which portion of the augmented reality panel relevant to the video scene of the event currently being displayed on the display device 140 is to be displayed on the rendering screen of the electronic device 160. To do so, the camera of the electronic device 160 is held and oriented by the user towards the direction of the display device 140. Then, the shape of the video, corresponding to the event currently being displayed on the display device 140, is detected on the rendering screen of the electronic device 160 and analyzed using well-known real time image recognition and analysis technics. The position and dimensions of the display device 140 as viewed by the camera of the electronic device 160 are obtained as output of this analysis. However, the dimensions do not correspond to the dimensions at which the display device 140 is viewed by the user in the plane of the rendering screen of the electronic device 160. This is due to the camera's properties and more particularly to the camera's angle of view also referred to as the "Field of View" ("FoV") angle. Depending on the electronic device 160 used, this "FoV" angle varies. Therefore, the calibration procedure enables users of any electronic devices having their own properties to compute the position where the video frames of the augmented reality panel are to be displayed on the rendering screen of the electronic device 160 and the dimensions of the video frames.

Figure 5:
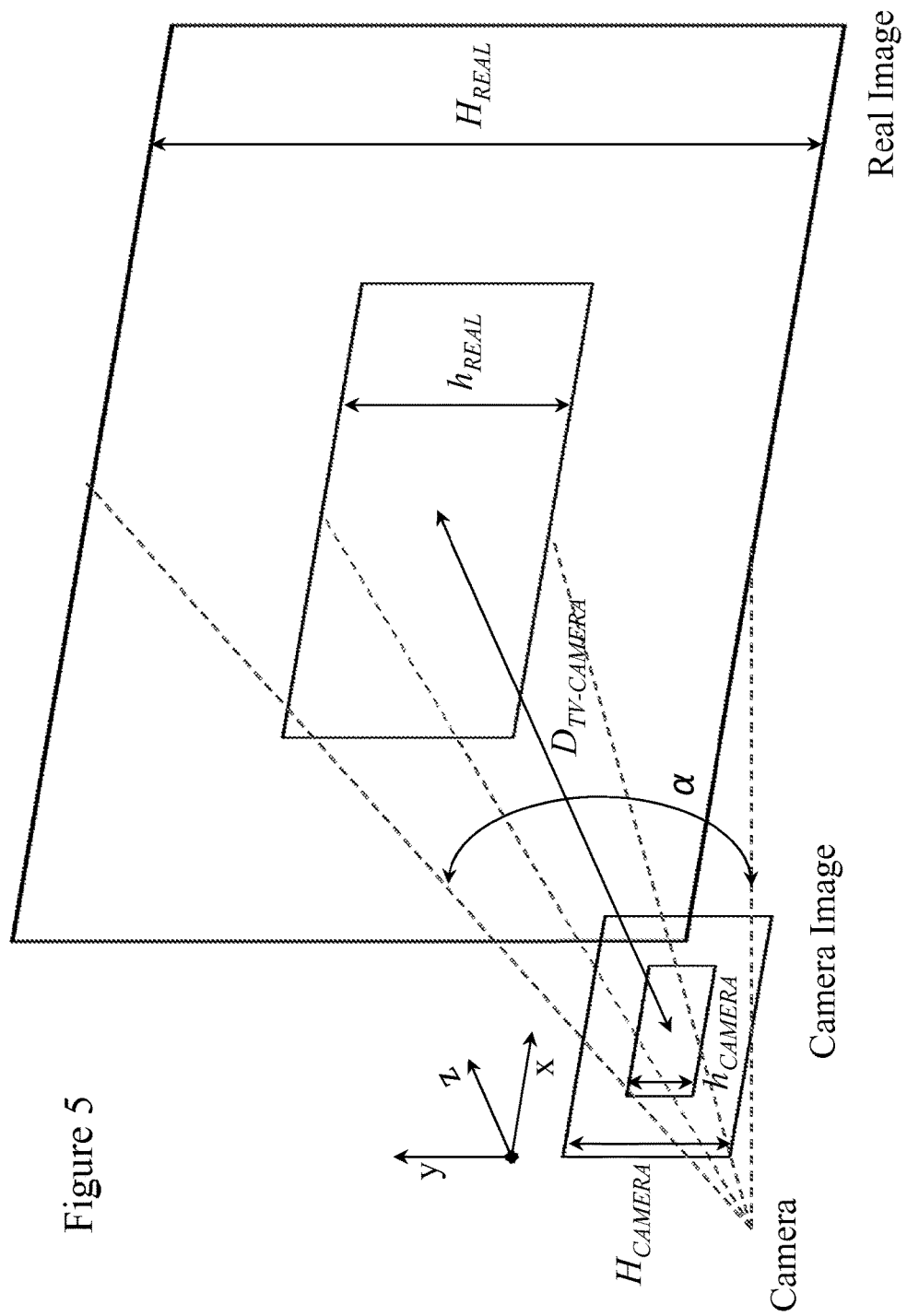
FIGS. 5 and 6 are pictorial illustrations of the calculations used in the automatic calibration procedure in accordance with an embodiment of the present invention.
Figure 6:
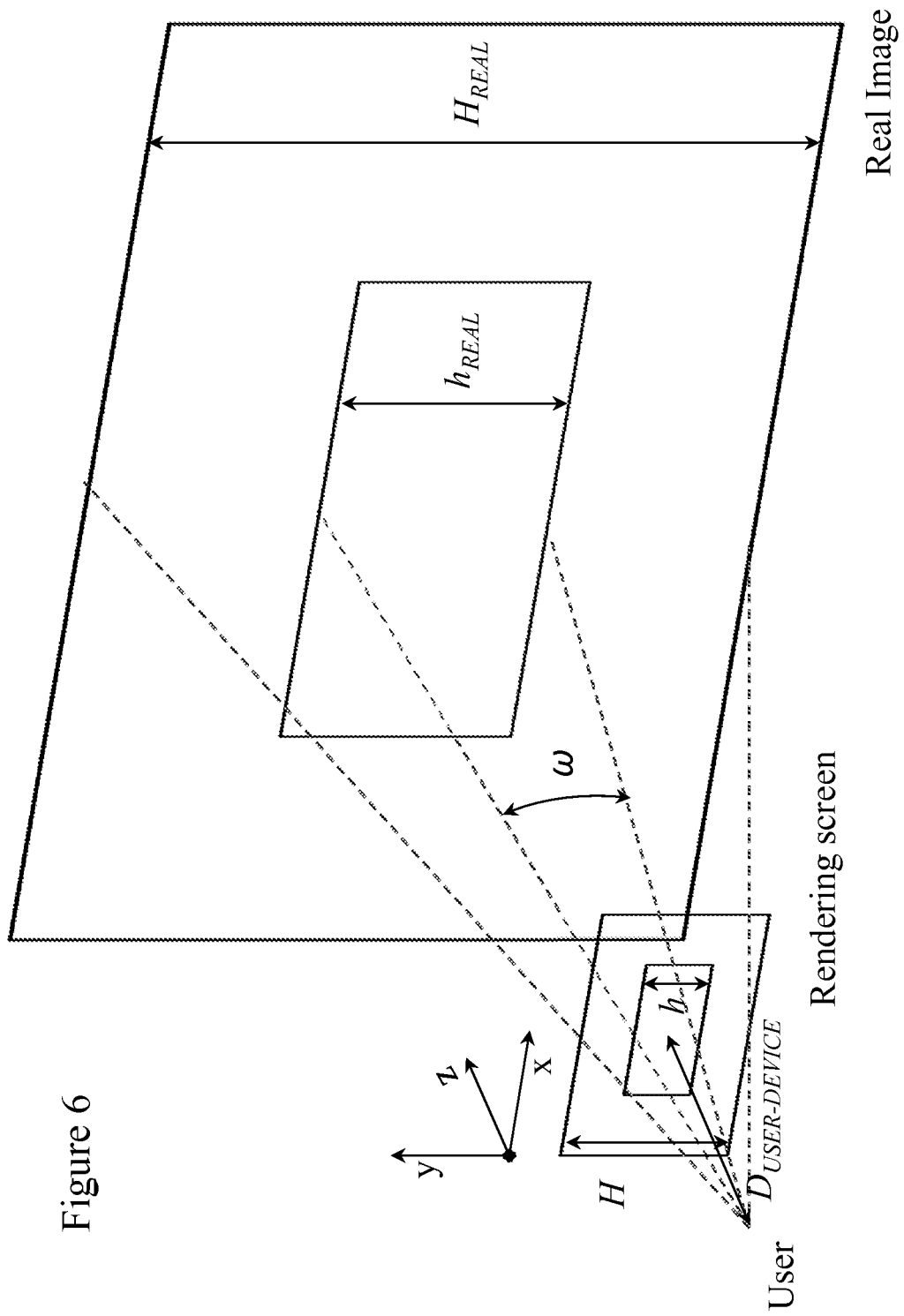

Reference is now made to FIGS. 5 and 6, which are pictorial illustrations of the calculations used in the automatic calibration procedure according to an embodiment of the present invention. The computed dimensions typically correspond to a homothetic transformation of the dimensions and position of the video displayed on the display device 140 as viewed by the user in the plane of the rendering screen of the electronic device 160. FIG. 5 shows two planes:
 a display device plane corresponding to the real image viewed by the camera in which:
  $H_{REAL}$ is the height of the real image; and
  $N_{REAL}$ is the height of the detected video shape; and
 a camera plane corresponding to the camera image as viewed by the camera according to its own "FoV" angle for which:
  $H_{CAMERA}$ is the height corresponding to $H_{REAL}$ as viewed by the camera of the electronic device 160; and
  $h_{CAMERA}$ is the height corresponding to $N_{REAL}$ as viewed by the camera of the electronic device 160.

Furthermore, FIG. 5 shows two additional parameters: α corresponding to the vertical "FoV" angle of the camera; and $D_{TV-CAMERA}$ corresponding to the distance between the camera of the electronic device 160 and the display device 140.

The vertical "FoV" angle is a constant defined as an intrinsic property of the electronic device 160 and is given by:

$$\alpha = \frac{H_{REAL}}{D_{TV-CAMERA}}$$

The camera image and recognized shape of the video provide $H_{CAMERA}$ and $h_{CAMERA}$ where:

$$\frac{H_{CAMERA}}{h_{CAMERA}} = \frac{H_{REAL}}{h_{REAL}}$$

By combining the two equations given hereinabove, it is possible to compute the angle under which the display device 140 is viewed from the electronic device:

$$\frac{H_{CAMERA}}{h_{CAMERA}} = \alpha \cdot \frac{D_{TV-CAMERA}}{h_{REAL}}$$

Assuming that the distance between the user and the electronic device 160 $D_{USER-DEVICE}$ is negligible compared to $D_{TV-CAMERA}$, then the user's angle of view (corresponding to how the display device 140 is viewed by the user) denoted by ω may be computed as follows:

$$\omega = \alpha \cdot \frac{h_{CAMERA}}{H_{CAMERA}}$$

FIG. 6 shows a display device plane and a rendering screen plane of the electronic device 160 for which:

h is the height at which the video frames of the augmented panel are to be rendered on the rendering screen of the electronic device 160; and H is the height of the portion of the augmented reality panel that is to be rendered on the rendering screen of the electronic device 160 and typically corresponds to the height of the rendering screen.

Similarly to the vertical "FoV" angle α for the camera, ω corresponds to the vertical "FoV" angle of the user and may be given by:

$$\omega = \frac{H}{D_{USER-DEVICE}}$$

Therefore, the height h at which the video frames of the augmented reality panel are to be rendered on the rendering screen of the electronic device 160 is given by:

$$h = \alpha \cdot \frac{h_{CAMERA}}{H_{CAMERA}} \cdot D_{USER-DEVICE}$$

where, α is an intrinsic property of the camera; $h_{CAMERA}$ and $H_{CAMERA}$ are given by the camera; and $D_{USER-DEVICE}$ is fixed as a constant corresponding to the distance between the user and the electronic device 160.

All these equations show that the height h depends on $h_{CAMERA}$ and $H_{CAMERA}$. It is then possible to derive the width w of the video frames. This width w typically depends on the ratio of the video R e.g. 16/9 and is given by:

$$w = h \cdot R$$

In an embodiment of the present invention, the user typically holds the electronic device 160 in front of the display device 140 to perform the calibration procedure. However, in another embodiment of the present invention, the user is also able to perform the calibration procedure even if he is not located in front of the display device 140. In such a situation, $h_{CAMERA}$ and $H_{CAMERA}$ will be computed as an average between the left and right corresponding heights of the camera image. Also, in order to ease the image recognition and analysis process, the user is requested to orientate the electronic device 160 towards the direction of the display device 140 so that the display device 140 appears entirely in the camera image.

Figure 7:
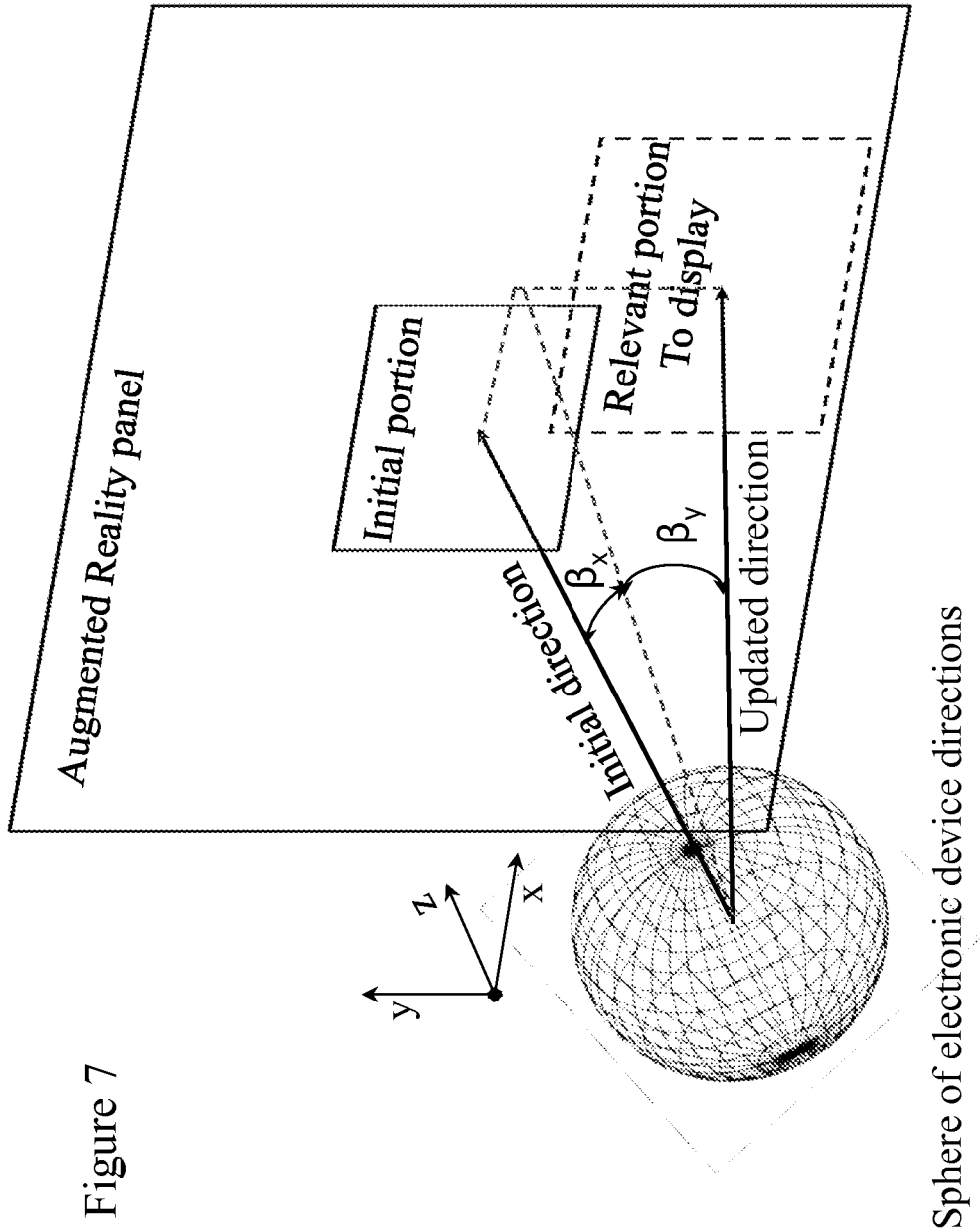
FIG. 7 is a pictorial illustration showing a relevant portion of the augmented reality panel to render on the rendering screen of an electronic device in accordance to an embodiment of the present invention.

Reference is now made to FIG. 7, which is a pictorial illustration showing a relevant portion of the augmented reality panel to render on the rendering screen of the electronic device 160 according to an embodiment of the present invention.

The orientation module 170 e.g. gyroscope and accelerometer sensors of the electronic device 160 are used to determine which portion of the augmented reality panel to render on the rendering screen of the electronic device 160. This orientation module 170 is typically able to detect an orientation change of the electronic device 160 i.e. when the electronic device 160 is moved and/or turned around. The user holding the electronic device 160 can move in a plurality of directions. However, each user movement can be modeled as a movement around a sphere as shown in FIG. 7. This sphere is centered on the user and has a radius corresponding to the distance between the user and the electronic device 160. Therefore, the following user movements may be considered:

rotating the electronic device 160 around the Y-axis parallel to the plane of the rendering screen corresponds to a left or right movement around the sphere and therefore left or right surrounding content is rendered on the rendering screen of the electronic device 160. This motion detection may be done efficiently in order to support a minimal frame rate of for example, but without limiting the generality of the invention, 15 images per second;

rotating the electronic device around the X-axis parallel to the plane of the rendering screen corresponds to an up or down movement around the sphere to the top or bottom of the sphere and therefore top or bottom surrounding content is rendered on the rendering screen of the electronic device 160. This motion detection may be done efficiently in order to support a minimal frame rate of for example, but without limiting the generality of the invention, 15 images per second; and moving the electronic device 160 along the Z-axis perpendicular to the plane of the rendering screen typically corresponds to a zoom-in or zoom-out effect and is similar to a new calibration procedure.

For all these user movements, the motion of the electronic device 160 is detected by the orientation module 170. At each motion detection, the orientation module 170 sends to the client device 120 its change of position (delta position) from the initial position (i.e. the initial position indicating the direction of the display device 140 at the end of the calibration procedure represented by the central portion of the augmented reality panel in FIG. 7) both in terms of distance to the display device 140 (e.g. using the accelerometer sensor) and in terms of direction to the display device 140 (e.g. using the gyroscope sensor). The output from the motion detection may be:

an update of the calibration procedure comprising updated dimensions and position of the video frames (and in turn, of the augmented reality panel) as well as an updated initial position. This typically corresponds to a movement along the Z-axis perpendicular to the plane of the rendering screen of the electronic device 160 for which a new calibration procedure is performed; and/or a difference of angle between the initial position and the new position. This typically corresponds to a movement around the X-axis and/or the Y-axis parallel to the plane of the rendering screen of the electronic device 160.

For both outputs, the relevant portion of the augmented reality panel is defined by the following parameters:

height $h_{PORTION}$ and width $w_{PORTION}$ ($h_{PORTION}$, $w_{PORTION}$) dimensions. These dimensions are determined at the end of each calibration procedure (i.e. initial calibration procedure and/or when a movement of the electronic device 160 along the Z-axis is detected by the orientation module 170 e.g. by the accelerometer sensor) using the computed dimensions (h, w) of the video frames and $h_{REAL}$. The relationship between these parameters is given below:

$$\frac{H}{h_{PORTION}} = \frac{h}{h_{REAL}}$$

and so, $$h_{PORTION} = \frac{H}{h} \cdot h_{REAL}$$

Also, the width $w_{PORTION}$ is given by:

$$w_{PORTION} = h_{PORTION} \cdot R$$

a position in the augmented reality panel defined by the coordinates $x_{PORTION}$ and $y_{PORTION}$ ($x_{PORTION}$, $y_{PORTION}$). These coordinates are set to (0, 0) according to the initial direction obtained during the calibration procedure. Then, when a rotation of the electronic device 160 around an axis X and/or Y is detected, the orientation module 170 e.g. the gyroscope sensor determines the angular difference ($\beta_x$, $\beta_y$) with the initial direction. The new coordinates corresponding to the new relevant portion of the augmented reality panel to render are given by:

$$x_{PORTION} = D_{USER\text{-}DEVICE} \cdot \beta_x$$

and, $$y_{PORTION} = D_{USER\text{-}DEVICE} \cdot \beta_y$$

Those skilled in the art will appreciate that the coordinates are expressed with respect to a reference point set to correspond to the initial direction. The reference point may be any suitable point of the portion of the augmented reality panel such as for example, but without limiting the generality of the invention, the center of the portion, the top left corner, etc.

Therefore, when a user moves the electronic device 160 along the Z-axis perpendicular to the plane of the rendering screen of the electronic device 160, the dimensions of the relevant portion of the augmented reality panel to display ($h_{PORTION}$, $w_{PORTION}$) and the initial direction are updated. The coordinates ($x_{PORTION}$, $y_{PORTION}$) are computed when the electronic device 160 is moved around the sphere, i.e. rotated around the X-axis and/or Y-axis parallel to the plane of the rendering screen of the electronic device 160. In this latter case, the dimensions ($h_{PORTION}$, $w_{PORTION}$) of the augmented reality panel do not change.

Although the above embodiments have been described in the context of DVB implementation, someone skilled in the art will realize that other implementations are possible.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather the scope of the invention is defined by the appended claims and equivalents thereof.

The invention claimed is:

1. A method implemented on an electronic device comprising:

enabling said electronic device to communicate with a video database and a client device, said client device being associated with a first display device currently displaying a video scene of an event;

receiving a user input requesting augmented video content associated with said video scene;

retrieving, from the video database, a content panel corresponding to said augmented video content associated with said video scene in response to said user input, said content panel comprising video frames of a video content item and additional content surrounding said video frames, wherein said video content item has a matching content identifier as said event and said video frames correspond to video frames of said video scene currently being displayed on said first display device;

identifying a relevant portion of said content panel to render on a second display associated with said electronic device by: determining a position and dimensions at which said relevant portion is to be rendered on said second display device; and identifying said relevant portion according to said determined position and dimensions;

rendering said relevant portion of said content panel on said second display device associated with said electronic device;

detecting an orientation change of said electronic device;

identifying a new relevant portion of said content panel to render on the second display device associated with said electronic device, said new relevant portion being identified according to said detected orientation change; and rendering said new relevant portion on said second display device.

2. The method of claim 1, wherein said determining further comprises determining an initial direction corresponding to a direction of said first display device relative to said electronic device.

3. The method of claim 1, wherein said determining comprises determining a position and dimensions at which said video frames of said content panel are to be rendered on said second display device.

4. The method of claim 1, wherein said determining is performed using a camera of said electronic device.

5. The method of claim 1, wherein said detecting an orientation change comprises detecting a rotation of said electronic device around an axis parallel to a plane of said second display device.

6. The method of claim 5, wherein said rotation is detected by a gyroscope sensor of said electronic device.

7. The method of claim 1, wherein said detecting an orientation change comprises detecting a movement of said electronic device along an axis perpendicular to a plane of said second display device.

8. The method of claim 7, wherein said movement is detected by an accelerometer sensor of said electronic device.

9. The method of claim 1, wherein said identifying a new relevant portion comprises:
calculating coordinates of said new relevant portion of said content panel with respect to an initial position of said relevant portion when said detected orientation change is a rotation of said electronic device around an axis parallel to a plane of said second display device; and
identifying said new relevant portion using said calculated coordinates.

10. The method of claim 1, wherein said identifying a new relevant portion comprises:
determining a position and dimensions at which said new relevant portion of said content panel is to be rendered on said second display device when said detected orientation change is a movement of said electronic device along an axis perpendicular to a plane of said second display device; and
identifying said new relevant portion of said content panel according to said determined position and dimensions.

11. An electronic device comprising:
a communications interface operable to: enable said electronic device to communicate with a video database and a client device, said client device being associated with a first display device currently displaying a video scene of an event; and to receive a user input requesting augmented video content associated with said video scene; and
a processor operable to: retrieve, from the video database, a content panel corresponding to said augmented video content associated with said video scene in response to said user input, said content panel comprising video frames of a video content item and additional content surrounding said video frames, wherein said video content item has a matching content identifier as said event and said video frames correspond to video frames of said video scene currently being displayed on said first display device; and to identify a relevant portion of said content panel by: determining a position and dimensions at which said relevant portion is to be rendered on said second display device; and identifying said relevant portion according to said determined position and dimensions; and
a rendering screen operable to render said relevant portion of said content panel;
wherein said processor is further operable to: detect an orientation change of said electronic device; and identify a new relevant portion of said content panel to render on the second display device associated with said electronic device, said new relevant portion being identified according to said detected orientation change, and
wherein said rendering screen is further operable to render said new relevant Portion on said second display device.

12. One or more non-transitory computer readable storage media encoded with software comprising computer executable instructions and when software is executed operable to:
enable said electronic device to communicate with a video database and a client device, said client device being associated with a first display device currently displaying a video scene of an event;
receive a user input requesting augmented video content associated with said video scene;
retrieve, from the video database, a content panel corresponding to said augmented video content associated with said video scene in response to said user input, said content panel comprising video frames of a video content item and additional content surrounding said video frames, wherein said video content item has a matching content identifier as said event and said video frames correspond to video frames of said video scene currently being displayed on said first display device;
identify a relevant portion of said content panel to render on a second display associated with said electronic device by: determining a position and dimensions at which said relevant portion is to be rendered on said second display device; and
identifying said relevant portion according to said determined position and dimensions;
render said relevant portion of said content panel on said second display device associated with said electronic device;
detect an orientation change of said electronic device;
identify a new relevant portion of said content panel to render on the second display device associated with said electronic device, said new relevant portion being identified according to said detected orientation change; and
render said new relevant portion on said second display device.

* * * * *

UNITED STATES PATENT AND TRADEMARK OFFICE
CERTIFICATE OF CORRECTION

PATENT NO. : 9,747,723 B2
APPLICATION NO. : 14/425327
DATED : August 29, 2017
INVENTOR(S) : Laurent Gardes et al.

Page 1 of 1

It is certified that error appears in the above-identified patent and that said Letters Patent is hereby corrected as shown below:

On the Title Page

Item (71), Applicants, Column 1, "Laurent Gardes, Meudon (FR); Yann Prat, Elancourt (FR); Olivier Lacour, Paris (FR); Didier De Marrez, Charenton-le-Pont (FR); Laurent Chauvier, Villevallier (FR)" to read as --Cisco Technology, Inc., San Jose, CA (US)--.

In the Specification

Column 8, Line 59, "N" to read as --h--.

Column 8, Line 66, "N" to read as --h--.

In the Claims

Column 14, Line 20 approx., Claim 11, "Portion" to read as --portion--.

Signed and Sealed this
Seventeenth Day of October, 2017

Joseph Matal
*Performing the Functions and Duties of the
Under Secretary of Commerce for Intellectual Property and
Director of the United States Patent and Trademark Office*